United States Patent
Odins-Lucas et al.

(10) Patent No.: US 8,572,755 B2
(45) Date of Patent: Oct. 29, 2013

(54) TRUST VERIFICATION IN COPY AND MOVE OPERATIONS

(75) Inventors: Zeke B. Odins-Lucas, Seattle, WA (US); Samuel Fortiner, Redmond, WA (US); Marc A Silbey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1326 days.

(21) Appl. No.: 11/092,177

(22) Filed: Mar. 29, 2005

(65) Prior Publication Data
US 2006/0225137 A1    Oct. 5, 2006

(51) Int. Cl.
*H04N 7/16* (2011.01)

(52) U.S. Cl.
USPC ............... 726/27; 726/2; 726/25; 709/225; 709/226

(58) Field of Classification Search
USPC .......... 713/1, 2, 188, 194; 380/200, 201, 255, 380/277; 726/2, 25, 27; 709/225, 226
See application file for complete search history.

(56) References Cited

U.S. PATENT DOCUMENTS

| | | | | |
|---|---|---|---|---|
| 5,590,266 A | * | 12/1996 | Carson et al. | 715/741 |
| 6,256,657 B1 | * | 7/2001 | Chu | 718/1 |
| 6,658,403 B1 | * | 12/2003 | Kuroda et al. | 707/2 |
| 7,240,199 B2 | * | 7/2007 | Tomkow | 713/168 |
| 7,284,082 B2 | * | 10/2007 | Greenberger | 710/312 |
| 7,437,568 B2 | * | 10/2008 | Das-Purkayastha et al. | 713/187 |
| 8,006,192 B1 | * | 8/2011 | Reid et al. | 715/762 |
| 2002/0095454 A1 | * | 7/2002 | Reed et al. | 709/201 |
| 2005/0015429 A1 | * | 1/2005 | Ashley et al. | 709/200 |
| 2005/0081039 A1 | * | 4/2005 | Lee et al. | 713/176 |
| 2006/0190606 A1 | * | 8/2006 | Kohavi | 709/226 |

* cited by examiner

*Primary Examiner* — Saleh Najjar
*Assistant Examiner* — Joseph Pan
(74) *Attorney, Agent, or Firm* — Wolfe-SBMC

(57) ABSTRACT

When using a clipboard or drag-and-drop interface of a graphical computer interface, a source application includes trust information along with data that is proffered to a target application. The target application conditions its acceptance of such data based on the trust information.

20 Claims, 3 Drawing Sheets

TRUST VERIFICATION IN COPY AND MOVE OPERATIONS

TECHNICAL FIELD

The techniques described below relate to protecting computers from inadvertently obtained content that might otherwise perform harmful operations.

BACKGROUND

Substantial efforts have been made in recent years to combat malicious attacks against personal computers. One particular emphasis of these efforts has been to protect against inadvertently loading and initiating executable code that is designed to act against users' best interests.

Computer viruses and other harmful code can be transferred in many ways, depending only on the imagination and ingenuity of those responsible for the viruses. Perhaps one of the simplest ways to transfer such content is to somehow fool a computer user into thinking he or she is initiating a legitimate program or is taking some other non-harmful action.

The Internet poses one of the biggest risks of obtaining viruses and other malicious content. The Internet is a vast public network, with very few inherent user protections. Nearly anyone can connect to the Internet, and it is relatively easy to hide one's identity when communicating over the Internet. Furthermore, Internet users are often relatively unaware of the specific dangers that can result from their actions, and can thus become easy targets.

Although significant progress has been made in protecting users against these threats, there remains an ongoing need to protect against various forms of dangerous content that might be inadvertently obtained or referenced from the Internet and other sources.

SUMMARY

When copying data using facilities or services of a third-party application or operating system, such as drag-and-drop or copy-and-paste operations, the source application provides trust or security information to the target application, and the target application conditions its acceptance of any transfer based on the trust or security information.

DETAILED DESCRIPTION

Figure 1:
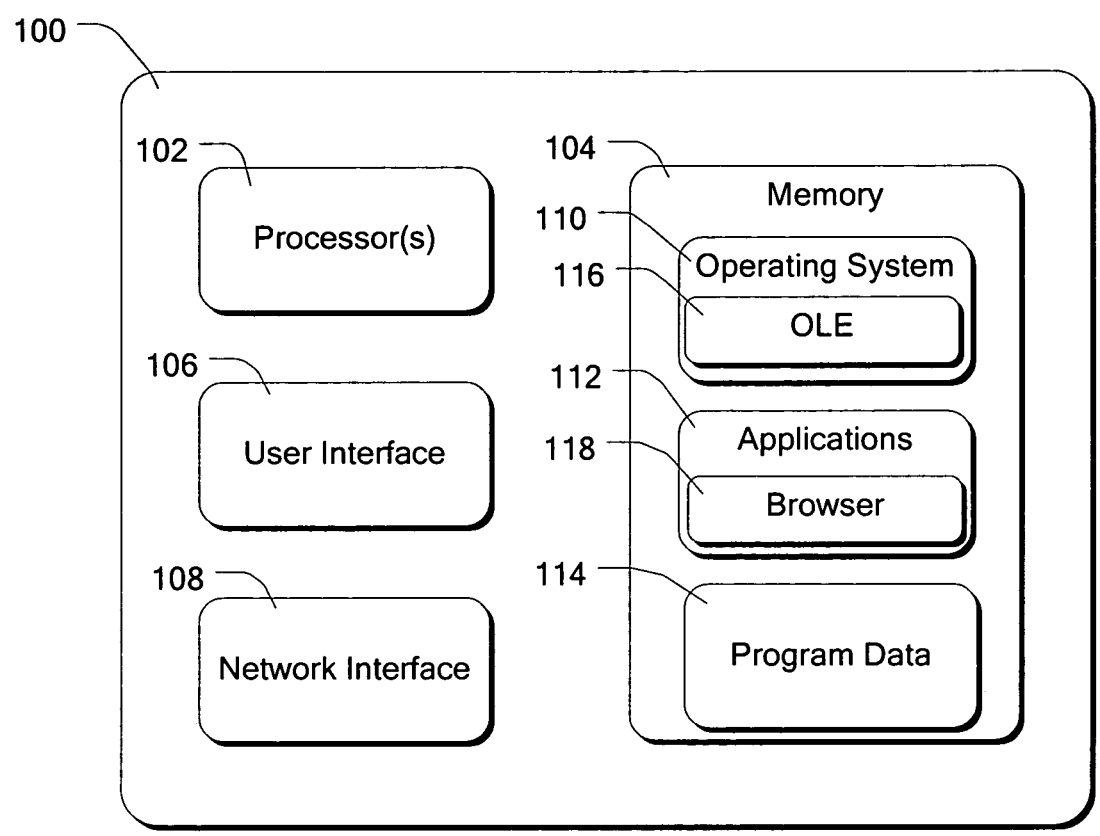
FIG. 1 is a block diagram illustrating a computer system in accordance with a described embodiment.

Most popular user-oriented computers utilize what has become known as a graphical user interface, or "GUI". In today's GUIs, users control the computer in large part by moving an on-screen pointer and "clicking" on various data objects that are represented graphically on the screen. For example, Internet navigation takes place primarily by clicking on various graphically-represented links displayed on a web page. In other contexts, computer tasks can be accomplished by interacting with graphical icons or other graphically-represented objects in different ways. As another example in this context, a data file can be copied or moved from one file directory to another by clicking and dragging an icon that represents the data file.

Clicking and dragging in this manner is referred to as a click-and-drag operation, and can be used for various types of copying or moving. In a typical example of such an operation, the user positions the on-screen pointer over the graphical object representing the data object that is to be copied or moved, and then presses and holds a mouse button. While continuing to press the mouse button, the user moves the mouse and corresponding on-screen pointer to a graphical screen area or location that represents the target location. Once the on-screen pointer is thus positioned, the user releases the mouse button, and the computer performs the copy or move operation.

In some cases, the data that is subject to the click-and-drag operation is identified or delineated prior to the actual click-and-drag operation. For example, suppose that a user is working within a word processing program and desires to move a sentence from one location to another. To accomplish this, the user first highlights the sentence or otherwise delineates it using features of the word processing program. After the sentence is highlighted, the user can click and drag it as already described.

Modern operating systems such as the Windows® family of operating systems (available from Microsoft Corporation) support drag-and-drop operations between applications. Thus, if a user wants to copy a sentence or other data object from one application to another, he or she can simply drag it between applications as described above. Using this operating system feature, data can be conveniently copied and moved within a single application, between instances of the same application, and between different applications. Furthermore, data can be copied or moved to and from operating system components such as a computer's file system.

The Windows® operating system also supports variants of the described drag-and-drop operations using very similar mechanisms. For example, the Windows® "clipboard" allows similar copy-and-paste functionality. When using the clipboard, the user highlights or otherwise selects the data object to be copied or moved, using the graphical elements of the GUI. Then, the user instructs the operating system to "copy" the selected data object to a separate storage area maintained by the operating system, referred to as the clipboard. In the Windows® operating system, this is done by pressing a mouse key to open a context menu, and selecting "copy" from the context menu. Alternatively, the user can simply press the "ctrl-c" keyboard combination.

Once a data object is copied in this fashion to the clipboard, the user can position the on-screen pointer to the location where it is desired to copy or move the data, and then instruct the operating system to "paste" the data object at the indicated location. This is done by pressing a mouse key to open a context menu and selecting "paste" from the context menu. Alternatively, the user can simply press the "ctrl-v" keyboard combination.

As a slight alternative to the copy functionality described above, users can also "move" data or data objects. A "copy" operation duplicates the selected data, while a "move" operation deletes it from its original location and inserts it at a new location. "Cut-and-paste" is another way to refer to a "move" operation.

The Windows® component responsible for the functionality described above is referred to as Object Linking and Embedding, or "OLE", and is well documented. OLE interacts with application programs to receive data that the user indicates will be copied, and to supply that data to receiving applications or locations.

More specifically, when a user initiates a copy or move operation (either by dragging or by selecting "copy/cut" from the context menu) from within an application, that application composes or constructs an intermediate data object and provides it to the operating system. The intermediate data object contains or describes the data that is the subject of the potential copy or move operation. As an example, if the subject of the copy or move operation is text, the intermediate data object might contain the actual text. Optionally, depending on the capabilities of the source application, the intermediate data object might contain the text in several different formats, such as plain text, HTML-formatted text, the native format of the source application, or other formats. As another example, if the subject of the copy or move operation is a file or something represented by a file, the intermediate data object might contain a description of the source or location of the file, rather than the file itself.

In general, the intermediate data object can contain various different types of information about the subject of the copy or move operation, as determined to be appropriate by the source application, in order to provide flexibility with regard to the types of target applications that can accept the subject data and the ways in which the target applications can accept the subject data.

Once compiled by the source application, the intermediate data object is passed to the operating system or OLE, which holds the intermediate data object pending a user instruction to insert the subject data at some other location. The user does this, as already described, by releasing the mouse button when the on-screen pointer is over the desired location (with drag-and-drop) or by selecting a "paste" operation (with copy-and-paste). At this point, the operating system notifies the target application and passes the intermediate data object to it. The target application examines the intermediate data object and determines whether it can accept the contained or described data at the location of the on-screen pointer. If so, the target application decides which form of the data to use (from choices available in the data object) and accepts the subject data as appropriate for that application.

Although the functionality described above is implemented as part of an operating system, an intermediary or third-party transfer service such as this can be implemented in different ways, by different executable computer entities. For example, the Microsoft Office® family of desktop applications implements its own clipboard for transfer of text and other data within and between applications. In general, an intermediary transfer service is a set of functionality, implemented by a computer, that accepts data or data objects describing or containing subject data that is to be copied; that holds that data or object in some form of intermediate store for potential transfer to an as yet unspecified target; and that potentially supplies the data or data objects to a target specified by a user independently of or later than specifying the subject data itself. The target may be an application program or some component or structure maintained by the operating system. The source and target may be the same or different applications. The source and target may comprise the same or different windows or screen areas within the GUI of an operating system. The intermediary transfer service can be an independent program or a function implemented by the source, target, or both.

The drag-and-drop and copy-and-paste functions described above are invaluable to many computer users. However, in studying how to safeguard computers from malicious, Internet-borne attacks, it has been found that these functions also create a vulnerability. The vulnerability is exposed when a user copies dangerous content or references from an application that has built-in protections from such content to another application that does not.

As an example, popular Internet browsers, such as Microsoft Corporation's Internet Explorer browser, employ various safeguards to ensure that content downloaded from the Internet cannot be used to damage or attack the computer onto which it is downloaded. A browser such as this can be configured to prevent downloading and/or executing certain types of content. Different "trust zones" can be configured, and different preventative measures are employed depending on the specific source of downloaded content. In many cases, a user is prompted before downloading or executing potentially dangerous content, and asked to confirm whether the source of the content is trusted. Other techniques involve encryption, digital signatures, and certificates that vouch for the identity and trustworthiness of the content source.

As illustrated above, however, users frequently copy downloaded content from one application, such as their Internet browser, to some other application using the convenience of drag-and-drop or copy-and-paste functions. Such target applications generally do not provide robust protections against dangerous content. Furthermore, even if the designer of the target application desires to provide such protections, there is no way for the application to evaluate the relative safety of the content. Unlike a browser, which can evaluate content based on its original source or prevent tampering by means of encryption or other security techniques, other applications generally have no way to ascertain the source, no way to establish whether the content has come from a trusted source, and no way to ensure the integrity of data that is being accepted from another application through a drag-and-drop or copy-and-paste operation.

Even more dangerously, the copy operations described above can be initiated without user interaction. Specifically, automation tools provided in the operating system (such as scripting languages) can be used to initiate, control, and complete such copy operations without the user's knowledge. For example, a malicious web page can programmatically start a drag operation with a script, and then use the script to drop the subject data onto a user's computer desktop or some other location on the user's computer. Such automation exposes the user to the danger that malicious attacks can be made even without the user performing any overt action other than browsing to a web page.

To mitigate the dangers described above, the inventors have devised a software mechanism that allows target application programs to evaluate the trustworthiness of certain content that is being offered through intermediary or third-party transfer services such as the drag-and-drop and copy-and-paste services described above. This mechanism is described below.

FIG. 1 shows a computer system 100 in which the techniques described below are implemented. The system includes one or more processors 102 and memory 104. Memory 104 may comprise various different types of computer readable storage media, including volatile and non-volatile memory, removable and non-removable memory, electronic and magnetic-based media, and media utilizing various other types of storage technology. The memory contains programs instructions that are executable by processor(s) 102 of computer 100 to perform the functionality described herein. Such programs and instructions are stored at different times in the different forms of available memory of the system. Programs are typically distributed, for example, on floppy disks or CD-ROMs. From there, they are installed or loaded into the secondary memory of a computer. At execution, they are loaded at least partially into the computer's primary electronic memory. The invention described herein includes these various types of computer-readable storage media when such media contain instructions or programs for implementing the described operations and function in conjunction with a microprocessor or other data processor. The invention also includes the system or computer itself when programmed according to the methods and techniques described below.

Computer system 100 also includes a user interface 106, which typically comprises a graphical display, a keyboard, and a mouse. Other types of user interface can alternatively be used.

Computer system 100 also includes an optional network interface 108, which might comprise an Ethernet interface, a telephone modem, a wireless network interface, or some other type of interface. This interface is used to connect computer system 100 to a network, which might be a private network, a local-area network, a wide-area network, and/or a public network such as the Internet.

As further shown in FIG. 1, system 100 includes an operating system 110, one or more application programs 112, and program data 114. For purposes of illustration programs, program components, and data are shown in FIG. 1 as discrete blocks within memory 104, although it is recognized that such functionality can be allocated in many different ways between computer components.

Operating system 110 in this example employs a graphical user interface in a windowing environment, such as employed by the Windows® family of operating systems. The operating system includes an OLE component 116, which for relevant purposes of this discussion acts as an intermediary transfer service as already described above. Specifically, OLE component 116 facilitates drag-and-drop and copy-and-paste functions by interacting with application programs to transfer information relating to desired transfers to and from such application programs. OLE also performs a host of other functions in the Windows® environment.

In this example, one of application programs 112 is an Internet Web browser 118 having traditional browsing capabilities. Browser 118 allows a user to browse or navigate through the World Wide Web of the Internet or any similar resources. Particular Web resources can be specified by a user by direct entry or by selecting a hyperlink, by other application programs through standard program interfaces, or by scripts contained in Web content itself. The browser supports drag-and-drop and copy-and-paste operations, where it acts as the source of data to be used in these operations. Thus, a user can select or highlight content within a browser window, and initiate a drag-and-drop or copy-and-paste function with the selected data as the object of the function.

Figure 2:
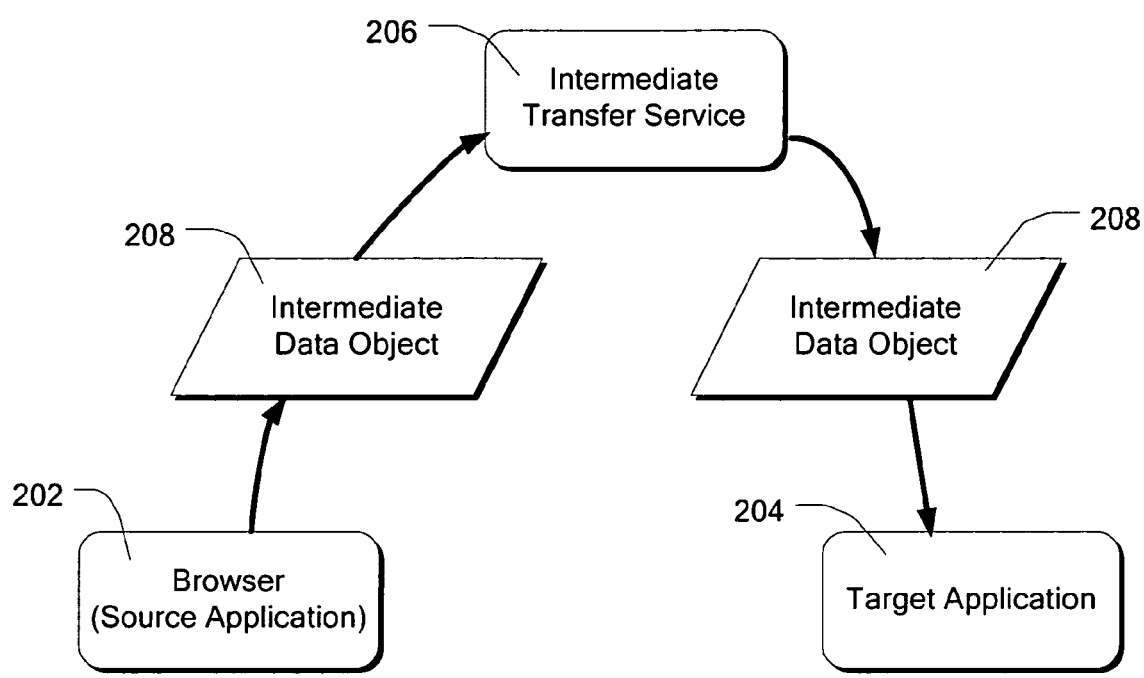
FIG. 2 is a block diagram illustrating a third-party data transfer in accordance with the described embodiment.

FIG. 2 shows, logically, the components involved in a drag-and-drop or copy-and-paste operation. A Web or Internet browser 202 acts as a source application in this example. A target application is shown, referenced by numeral 204. The object of the illustrated drag-and-drop or copy-and-paste operation is to copy or more some type of data or data object (referred to herein as subject data) from source application 202 to target application 204. In actual use, the source and target application may comprise sub-components of a single application, or different windows or screen areas of the same or different applications.

An intermediary transfer service 206 communicates with source application 202 and target application 204 to facilitate what will be generically referred to herein as a third-party data transfer. In this example, intermediary transfer service 206 is implemented by an OLE component, as described above.

Note that although the disclosed techniques will be described in the context of the Windows operating system and associated components, the same techniques can be used in other environments, and responsibilities can be distributed differently than shown by the discrete blocks of FIG. 2. Specifically, the intermediary transfer service can be implemented by the source application, the target application, or some entity other than OLE. Furthermore, the source and target may comprise the same application, with data being copied to and from different parts of or locations within the application or the data controlled by the application.

The third-party data transfer is initiated when a user selects some data or data object in the source application 202. This is normally done by using the graphical interface features of the computer, such as highlighting text or clicking on an object such as a picture. The user then instructs the computer to initiate a drag-and-drop or copy-and-paste operation by either dragging or clipping the selected data, as already described above. In response, the source application compiles an intermediate data object 208, and transfers it as shown to intermediary transfer service 206. This transfer is accomplished through various conventional programming interfaces supported by OLE component 116 (FIG. 1).

In addition to the information that is conventionally included in intermediate data object 208, the source application 202 also includes trust or security information in the intermediate data object. This information describes some characteristic of the subject data of the transfer operation, relating to the potential risk of the subject data as evaluated by the source application. As an example, the trust information might comprise a flag indicating whether the subject data originated locally or from the Internet.

In response to further user interactions, such as by "dropping" the subject data object or by selecting a "paste" operation, intermediary transfer service 206 eventually offers subject data to target application 204 by transferring the intermediate data object 208 to application 204. The target application receives the intermediate data object 208, and evaluates its content. In accordance with the OLE protocol, the target application can refuse to accept the subject data described by the intermediate data object. In accordance with the techniques developed by the inventors, the target application in this case evaluates the trust information to determine whether or not to accept the proffered subject data. In this example, the target application may be configured to accept the subject data only if the trust information, included in the intermediate data object, indicates that the data did not originate from the Internet. Alternatively, the target application may prompt the user for confirmation before accepting the subject data if the subject data originated from the Internet.

Trust information 210 may comprise a flag, as described above, indicating whether the subject data was obtained from a trusted source. In the example given above, it was assumed that the Internet as a whole was an untrusted source. However, there are different techniques that browser 202 might use to determine that even content obtained from the Internet should be considered relatively safe, or that a particular Internet source should be considered to be trusted. For example, many Internet sites utilize methods that allow browsers to determine the actual identity and authenticity of the sites. Communication protocols such as Secure Socket Layer (SSL) provide for exchange and authentication of identifying certificates, and subsequent encryption of transferred data. Such sites might be considered trusted when SSL communication techniques or similar techniques are employed.

Furthermore, more complex information regarding the subject data or its source might be included in intermediate data object 208 in order to allow target application to make more complex decisions regarding how to handle proffered data. For example, Microsoft's Internet Explorer utilizes a concept referred to as "trust zones", where different sites are evaluated to determine which of multiple relative safety levels they exhibit. An indication of such a trust zone, corresponding to the web site from which the subject data originated, might be included in intermediate data object 208 in place of the more simple flag described above. Other information might alternatively be used, including other indicators of the relative trustworthiness of the subject data or its source. Target application 204 can be configured to examine any such information, and to make a trust decision based on such information. Widespread interoperability within a particular operating environment can be ensured by standardizing the type and format of the trust information included in the intermediate data object.

Figure 3:
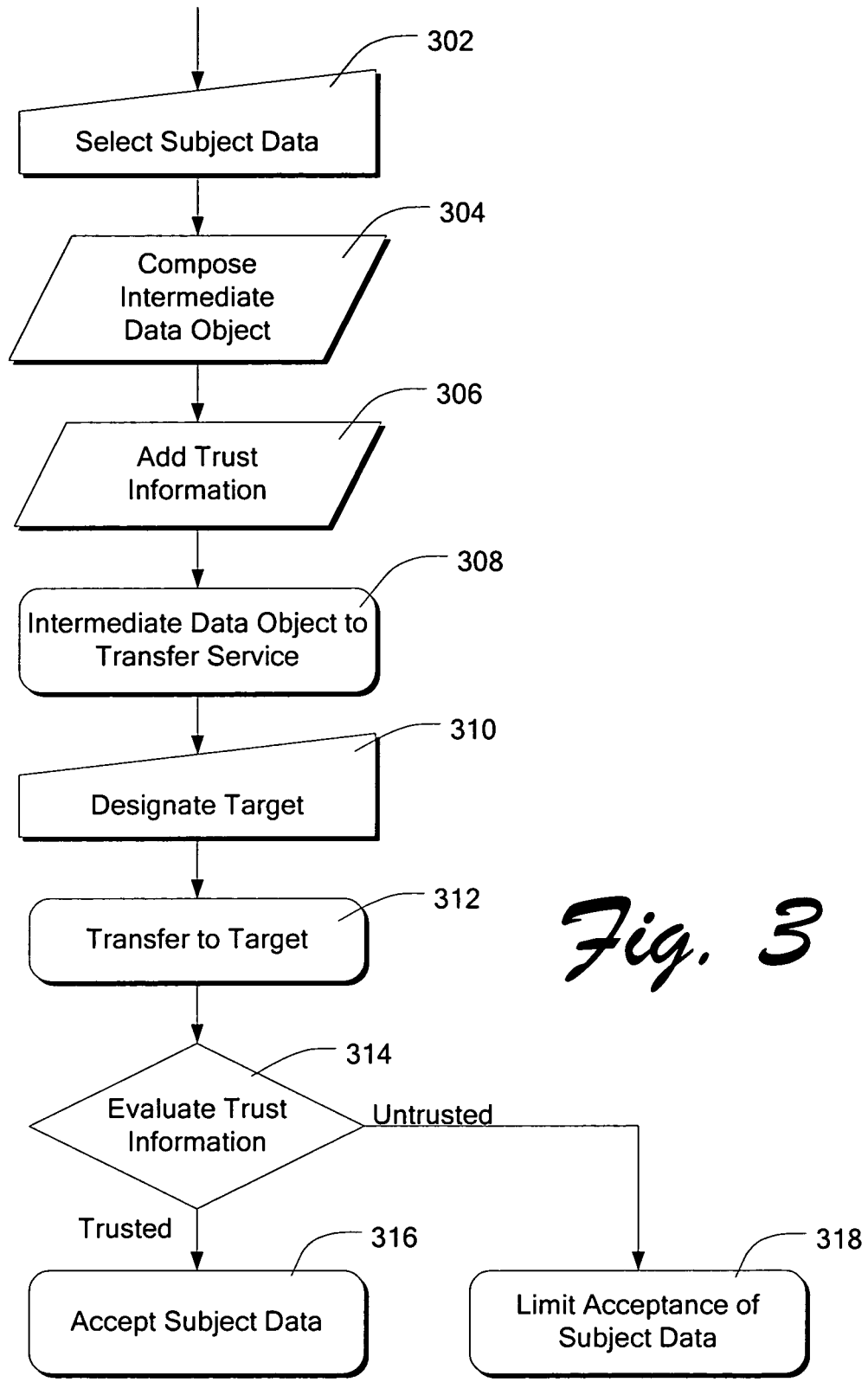
FIG. 3 is a flowchart illustrating methodological aspects of a third-party data transfer in accordance with the described embodiment.

FIG. 3 shows methodological aspects of the techniques described above. At block 302, a user highlights, delineates, or otherwise designates data that is to be the subject of a third-party data transfer, and initiates a "copy" or "drag" operation. In response, at block 304, the source application composes an intermediate data object indicating the subject data designated by the user. As described above, the intermediate data object in some cases may include various forms of the actual subject data. In other cases the intermediate data object may reference the subject data.

Block 306 comprises evaluating the trustworthiness or relative risk of the subject data and/or its source, and associating trust information with the intermediate data object. The trust information may comprise a flag indicating whether the subject data designated by the user was obtained from a trusted source, or whether the data was obtained from the Internet. Alternatively, or additionally, the trust information may be more complex, and may indicate a relative level of trust. For example, a trust level chosen from a scale of 1-5 might be indicated. Furthermore, the trust information may include various other types of information relating to the trustworthiness of the data source or the data itself, such as the Internet domain from which the subject data originated, the trust zone of the domain, or other application specific information relevant to the data source. In the described implementation, the trust information is incorporated within the intermediate data object.

Block 308 comprises providing the intermediate data object and the associated or incorporated trust information from the source application to the intermediary transfer service, and the intermediary transfer service receiving the intermediate data object for potential communication to a target application as designated by a user. In the described implementation, this transfer is accomplished by means of conventional interfaces associated with OLE.

Block 310 comprises allowing a user to designate a target application. This can be done in various ways, as already described, such as by selecting a "paste" option from a context menu or graphically dragging the subject data to a graphical area of the target application.

In block 312, the intermediary transfer service proffers or transfers the intermediate data object to the target application, and the target receives the intermediate data object. Again, this is accomplished in the described embodiment by means of conventional interfaces defined by OLE.

At block 314, the target application evaluates the trust information to determine whether to accept the subject data previously designated by the user, thereby conditioning transfer or acceptance of the subject data based on the trust information. The target application can be designed to perform this decision in different ways, depending on the capacity of the subject data for damage within the particular environment of the target application. Note also that the target application will typically be configured to reject the proffered data based on other criteria, such as whether the subject data is appropriate content for the target application or whether the subject data is in a compatible format.

If the result of decision block 314 is positive, execution flows to block 316, which comprises completing the operation by inserting the subject data at the location within the application program specified by the user. If the result is negative, execution flows to block 308, which comprises somehow limiting or conditioning the data transfer or acceptance. In some cases, the transfer might be denied. In other cases, the user might be prompted to confirm the insertion, while being warned that the subject data may be dangerous.

The invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method comprising:
   composing a data object by a source application on a computer, the data object indicating text or a picture, the text or the picture designated by a user via a copy or cut operation on the text or the picture, the copy or cut operation performed via the source application;
   evaluating, by the source application, the data object;
   associating, by the source application, trust information with the data object, the trust information including a flag indicating whether the text or the picture designated by the user was obtained from the Internet, the trust information further including a value that is associated with a scale of values and which indicates a level of trust associated with the text or the picture;
   receiving, by the source application, a request from the user to paste the text or the picture to a target application; and
   prompting, by the source application, the user for confirmation before pasting the text or the picture to the target application responsive to receiving the request from the user to paste the text or the picture when the flag indicates that the text or the picture was obtained from the Internet.

2. A method as recited in claim 1, wherein the data object includes the text or the picture designated by the user.

3. A method as recited in claim 1, wherein the data object references the text or the picture designated by the user.

4. A method as recited in claim 1, wherein the trust information further includes an additional flag indicating whether the text or the picture designated by the user was obtained from a trusted source.

5. A method as recited in claim 1, wherein the trust information indicates a relative level of trust corresponding to the source of the text or the picture designated by the user.

6. A method as recited in claim 1, further comprising conditioning pasting of the text or the picture designated by the user to the target application, based on the trust information.

7. The method as recited in claim 1, wherein the source application and the target application are different applications on the computer.

8. A method as recited in claim 1, wherein the request from the user to paste the text or the picture to the target application is received when the text or the picture is selected and graphically dragged to a graphical area of the target application.

9. A method as recited in claim 1, wherein the request from the user to paste the text or the picture to the target application is received when a command to paste the text or the picture to the target application is selected.

10. A method for use in conjunction with a transfer service of a computer having a graphical user interface, wherein said transfer service facilitates data transfer in response to user actions, the method comprising:
   receiving a data object from the transfer service, the data object composed at a source application of the computer and indicating (a) text or a picture, designated by a user, via a copy or cut operation on the text or the picture performed at the source application and (b) trust information regarding the text or the picture as evaluated and included by the source application, the trust information including:
      a flag indicating whether the text or the picture was obtained from the Internet; and
      a value that is associated with a scale of values and which indicates a level of trust associated with the text or the picture;
   receiving a request from the user to paste the text or the picture to a target application; and
   prompting the user for confirmation before pasting the text or the picture responsive to receiving the request from the user to paste the text or the picture when the flag indicates that the text or the picture was obtained from the Internet.

11. A method as recited in claim 10, wherein the data object includes the text or the picture.

12. A method as recited in claim 10, wherein the data object references the text or the picture.

13. A method as recited in claim 10, wherein the trust information further includes an additional flag indicating whether the text or the picture was obtained from a trusted source.

14. A method as recited in claim 10, wherein the trust information indicates a relative level of trust corresponding to the source of the text or the picture.

15. A method as recited in claim 10, wherein the request from the user to paste the text or the picture to the target application is received when the text or the picture is selected and graphically dragged to a graphical area of the target application.

16. A method as recited in claim 10, wherein the request from the user to paste the text or the picture to the target application is received when a command to paste the text or the picture to the target application is selected.

17. One or more computer-readable storage media containing instructions that are executable to cause a computer to perform actions comprising:
   composing a data object at a source application on the computer, the data object indicating text or a picture, the text or the picture designated by a user via a copy or cut operation on the text or the picture performed via the source application;
   evaluating the data object by the source application;
   including trust information in the data object by the source application, the trust information including a flag indicating whether the text or the picture was obtained from the Internet, the trust information further including a value that is associated with a scale of values and which indicates a level of trust associated with the text or the picture;
   receiving, by the source application, a request from the user to paste the text or the picture to a target application; and
   prompting, by the source application, the user for confirmation before pasting the text or the picture to the target application responsive to receiving the request from the user to paste the text or the picture when the flag indicates that the text or the picture was obtained from the Internet.

18. One or more computer-readable storage media as recited in claim 17, the actions further comprising allowing the user to paste the text or the picture to the target application by graphically dragging the text or the picture to a graphical area of the target application.

19. One or more computer-readable storage media as recited in claim 17, wherein the trust information further includes an additional flag indicating whether the text or the picture was obtained from a trusted source.

20. One or more computer-readable storage media as recited in claim 17, wherein the trust information indicates a relative level of trust corresponding to the source of the text or the picture.

* * * * *